United States Patent [19]

Nakazawa et al.

[11] Patent Number: 5,299,010
[45] Date of Patent: Mar. 29, 1994

[54] CHANNEL DISPLAY DEVICE FOR RECEIVABLE CHANNELS

[75] Inventors: Tsutomu Nakazawa; Hiroyasu Shindou; Masaru Tonozuka, all of Gunma, Japan

[73] Assignee: Sanyo Electric Co., Ltd., Osaka, Japan

[21] Appl. No.: 20,576

[22] Filed: Feb. 22, 1993

[30] Foreign Application Priority Data

Feb. 24, 1992 [JP] Japan .................................. 4-036440

[51] Int. Cl.⁵ .............................................. H04N 9/50
[52] U.S. Cl. .................................. 348/731; 348/732; 348/570
[58] Field of Search ............... 358/191.1, 192.1, 193.1, 358/194.1, 188; 455/161.1, 161.2, 166.1, 166.2, 185.1, 186.1; H04N 5/440, 5/50, 5/445

[56] References Cited

U.S. PATENT DOCUMENTS 4,870,492 9/1989 Hakamada et al. ............. 358/193.1

FOREIGN PATENT DOCUMENTS

| 60-22887 | 2/1985 | Japan | H04N 5/445 |
| 61-257084 | 11/1986 | Japan | H04N 5/440 |
| 63-174484 | 7/1988 | Japan | H04N 5/445 |
| 2-73786 | 3/1990 | Japan | H04N 5/445 |
| 3-68287 | 3/1991 | Japan | H04N 5/445 |

Primary Examiner—James J. Groody
Assistant Examiner—Michael H. Lee
Attorney, Agent, or Firm—Spensley Horn Jubas & Lubitz

[57] ABSTRACT

A channel display device in which a channel number which is receiving discrimination is flashed while a list of all channel numbers is displayed on a television screen. Also, a display color of the channel number discriminated as being in a receiving state is changed. Thus, a receivable channel from within a number of channels can be readily confirmed.

5 Claims, 3 Drawing Sheets

| ADDRESS | CODE MEMORY PART |
|---|---|
| ⋮ | ATTRIBUTE<br>CHARACTER CODE<br>ATTRIBUTE<br>CHARACTER CODE<br>⋮ |

Fig. 2

CHANNEL DISPLAY DEVICE FOR RECEIVABLE CHANNELS

BACKGROUND OF THE INVENTION i) Field of the Invention

The present invention relates to a channel display device for properly discriminating whether or not a channel number selected for watching and listening to predetermined image and sound on a television is a receiving channel.

ii) Description of the Related Arts

At the current time, the number of receivable channels that can be selected for watching and listening to image and sound on a television is very large, and can be a maximum number of between one and two hundred channels (181 channels in the U.S.A. and approximately 90 channels in Japan) including VHF and UHF bands. The fact that there are many channels prepared for receiving is because it will be possible to increase available information sources of mass media in the future, which is, of course, very advantageous for us. However, on the other hand, it is sometimes very troublesome to discriminate which channel is a preset receiving channel and which channels are not allocated from amongst all the receivable channels. When the preset channel is confirmed, for example, the individual channel information is viewed on the television screen and, when the image information is displayed, this is discriminated as a preset channel. In turn, the image information is not displayed, and this is discriminated as a not preset channel.

In the conventional present channel confirmation method, since the confirmation can not be carried out without displaying each individual channel information on the television display screen every time, it takes a considerable time to execute the confirmation and thus the operation is troublesome.

SUMMARY OF THE INVENTION

It is therefore an object of the present invention to provide a channel display device in view of the above-described problems of the prior art, which is capable of readily confirming a receivable channel within a number of channels.

According to the present invention, there is provided a channel display device for displaying an actual receivable channel from amongst a number of channels on which television broadcast can be carried out, comprising:

channel data storing means for storing channel numbers of all channels which are considered to be capable of receiving television broadcasts;

on-screen means for displaying a list of the television broadcast channels on a television screen on the basis of the stored content of the channel data storing means;

attribute storing means for storing an attribute for determining a display state of the channel corresponding to each channel number when the channel number stored in the channel data storing means is displayed on the television screen by the on-screen means;

tuning means for detecting whether or not a television signal is receivable in a predetermined frequency area and to output a tuning signal when the television signal is received;

attribute rewriting means for updating the attribute stored in the attribute storing means on the basis of the tuning signal; and tuner control means for controlling the tuning means so as to successively detect whether or not the television signals are receivable with respect to the frequencies corresponding to the channel numbers.

According to the present invention, a list of all the TV broadcast channels conceivable as receivable is displayed by the on-screen means. The display states of the channel numbers in this situation are determined by the attributes stored in the attribute storing means. The attribute rewriting means rewrites the attributes depending on the receiving states. That is, for a channel number whose television signal can be receive by the tuning means, the attribute is rewritten. Hence, while the list of the channel numbers is displayed on the screen, the display of the received channel number can be changed. Also, by changing the frequency to be successively detected by the tuning means, it can be discriminated whether or not all the channels are receivable, and this can be confirmed by the list display of the channels.

Further, the attribute rewriting means rewrites the attribute for the channel number corresponding to the frequency of the television signal which is received to change a display color of the channel number on the television screen.

By this operation, the received channel can be readily confirmed in the list display of the channels.

Also, the attribute rewriting means rewrites a predetermined attribute for the channel number corresponding to the frequency to be detected while it is not get detected whether or not the television signal is receivable by the tuning means.

Hence, while viewing the list display, the discrimination state of the receivable channels can be confirmed.

Further, the attribute rewriting means rewrites the attribute for the channel number to be detected to an attribute for a flash display.

Also, the channel data storing means is a video RAM in which character codes corresponding to a plurality of channel numbers are written in addresses corresponding to display positions of the channel numbers.

The channel display device further includes RAM means for storing the channel number corresponding to the frequency to be detected when the television signal is detected, and the attribute rewriting means rewrites the attribute for the corresponding channel number on the basis of the stored content in the RAM means.

Further, the channel display device further includes channel number input means for inputting the channel number, and the tuner control means discriminates whether or not only the television signal corresponding to the channel number input from the channel number input means is receivable.

Accordingly, the receiving state of only the desired channel can be confirmed.

BRIEF DESCRIPTION OF THE DRAWINGS

The objects, features and advantages of the present invention will become more apparent from the consideration of the following detailed description, taken in conjunction with the accompanying drawings, in which:

FIG. 2 is a schematic explanatory view showing a structure of a video ram used in the channel display device shown in FIG. 1.

DESCRIPTION OF THE PREFERRED EMBODIMENT

Figure 1:
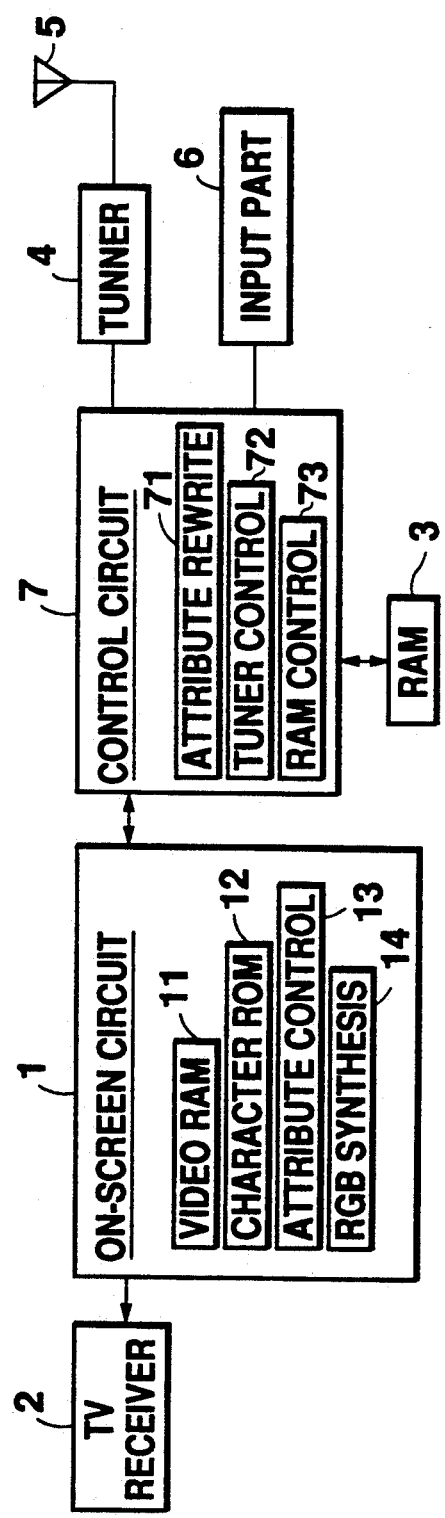
FIG. 1 is a block diagram of a channel display device according to the present invention.

Referring now to the drawings, there is shown in FIG. 1 one embodiment of a channel display device according to the present invention.

As shown in FIG. 1, in the channel display device, an on-screen circuit I is a circuit for carrying out an on-screen display of a predetermined character on a display screen of a television receiver 2 and includes a video RAM 11, a character ROM 12, an attribute controller 13, and a RGB synthesizer 14. The video RAM 11 stores character codes of characters to be displayed on the television screen. The addresses of the video RAM 11 correspond to display positions of the television screen, and by writing the character code into a predetermined position of the video RAM 11, the character specified by the character code is displayed in the corresponding position on the television screen.

That is, the addresses of the video RAM 11 can be accessed depending on the scanning positions of the horizontal scanning line of the television signals, and hence the addresses of the video RAM 11 are allocated corresponding to the character display positions on the television screen.

Further, the video RAM 11 stores not only the character codes corresponding to the display characters but also the attributes for representing the display states of the display characters. That is, as shown in FIG. 2, the character codes are stored in the addresses corresponding to the display positions on the screen and the attributes corresponding to their preceding addresses are stored, if necessary. The attributes are stored only when the attribute of the displaying characters are changed. Therefore the characters are displayed as the same attribute of the preceding character. As the attributes, for example, a flashing display, display colors, an underline and the like are given. Also, the attributes are stored as predetermined code data.

The character ROM 12 in the on-screen circuit 1 stores actual display images corresponding to the character codes and outputs the display image in response to the input character code. The attribute controller 13 controls the display state of the corresponding character due to the input attribute read out of the video RAM 11. The RGB synthesizer 14 converts the image data output from the character ROM 12 into RGB signals to be output to the television screen on the basis of the signal fed from the attribute controller 13. Then, the display of the character onto the television receiver 2 is executed on the basis of the obtained RGB signals. As described above, the character stored in the video RAM 11 is displayed in color at the predetermined position of the display screen on the basis of the attribute stored in the video RAM 11.

In this embodiment, character codes for displaying a list of all channel numbers such as 1 to 63 channels considered to be receivable in the predetermined positions on the television screen can be stored as an initial condition.

A RAM 3 stores the data for representing the channel numbers which are to be monitored to discriminate whether or not they are a receiving channel, and the address data corresponding to the character codes of the channel numbers within the video RAM 11. A tuner 4 detects whether or not a television signal of the predetermined channel number can be received. More specifically, it is detected whether or not there is the television signal obtained via an antenna 5 in a frequency area indicated by a control circuit 7 by using a PLL (phase locked loop) circuit. An input part 6 is a remote controller for operating the television receiver 2 and supplies a command to the control circuit 7 by a key input operation or the like.

The control circuit 7 controls the on-screen circuit 1, the RAM 3 and the tuner 4. That is, the control circuit 7 includes an attribute rewriter 71, a tuner controller 72 and a RAM controller 73. The attribute rewriter 71 rewrites the attribute of the character code in the predetermined address within the video RAM 11, and thus the display state of the channel number in the screen display is changed. Also, the tuner controller 72 controls the television signals discriminated in the tuner 4, and controls so as to successively discriminate the television signals corresponding to the channel numbers displayed in the list shown on the screen. The RAM controller 73 writes the channel numbers, discriminated as described above by the tuner 4, and the addresses of the channel numbers in the video RAM 11 into the RAM 3. Further, the control circuit 7 interprets the command supplied from the input part 6. In this case, the control circuit 7 can be composed of a CPU, and by executing a predetermined program, the operations of the attribute rewriter 71, the tuner controller 72 and the RAM controller 73 can be carried out.

Figure 3:
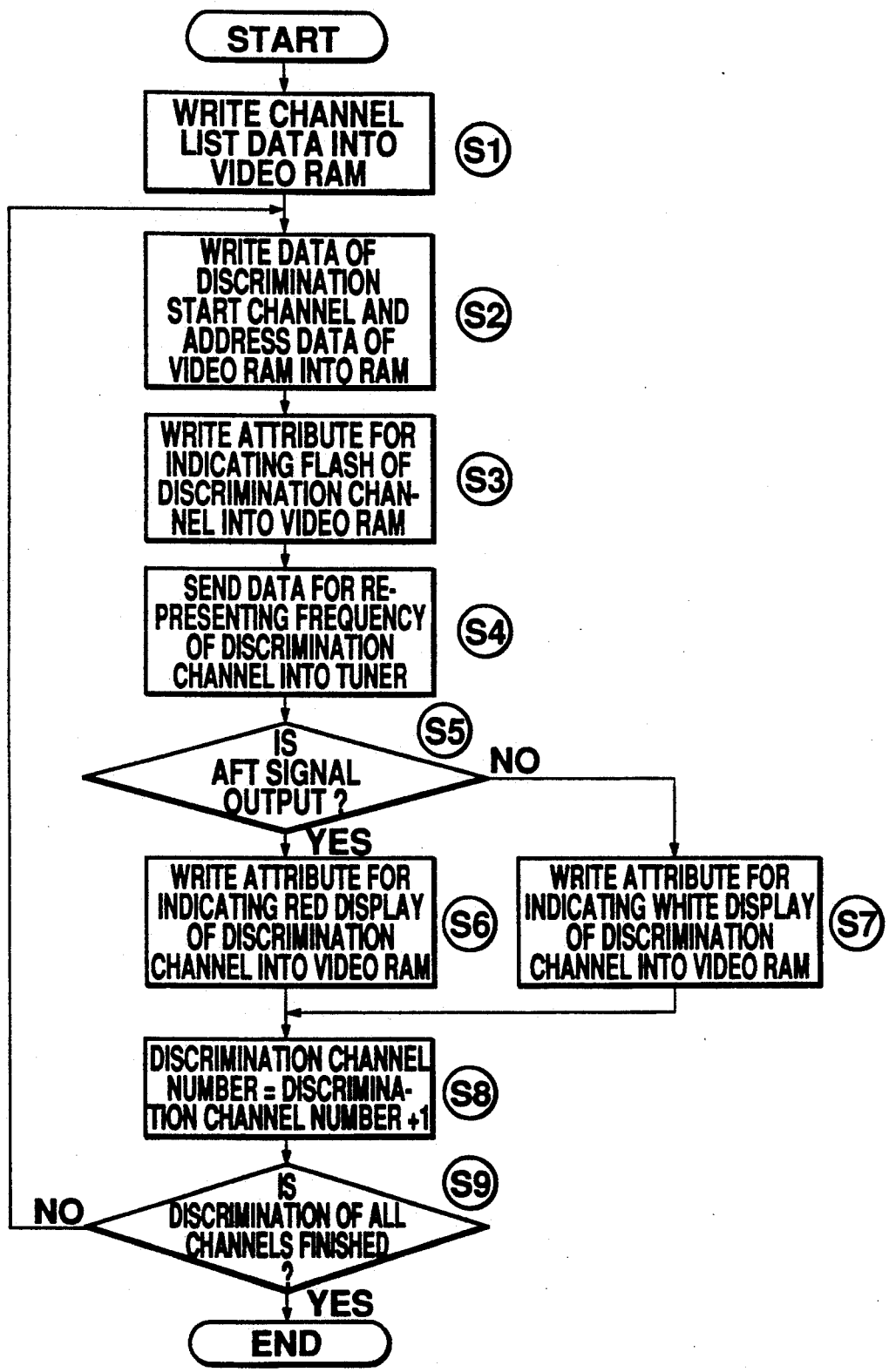
FIG. 3 is a flow chart showing an operation of the channel display device shown in FIG. 1.

The operation of the channel display device described above will now be described in detail in connection with FIG. 3.

First, in response to the command fed from the input part 6, the control circuit 7 consecutively discriminates whether or not each of the channels is a receiving channel, that is, starts an execution of a program instruction for an automatic search. By this operation, all the character codes for displaying a list of all the channels are written into the addresses corresponding to the channel number display positions on the television screen in the video RAM 11 in step S1. At this time, the attributes for performing the white light display of the channel numbers are also written into the video RAM 11. That is, the character codes and the attributes written in the video RAM 11 are processed in the on-screen circuit 1, and the list of the television signals of all the channel numbers shown in white with a predetermined single color background is displayed on the display screen.

Next, in order to successively discriminate whether or not each of 1 to 63 channels is a receiving channel, first, the discrimination operation of the first channel is carried out. That is, when the initial program for the automatic search stored in a ROM (not shown) within the control circuit 7 is executed, the data representing the first channel and the address data of the video RAM 11 storing the character code of the first channel are output from the RAM controller 73 in the control circuit 7 to the RAM 3 and the RAM 3 stores these data in step S2.

Then, at step S3, the address data stored in the RAM 3 are read into the control circuit 7, and an attribute code indicating flashing white is output from the attribute rewriter 71 in the control circuit 7 and is written into the video RAM 11, at the address immediately preceding the address at which the character code of the first channel is written. Hence, the character display of the first channel is flashed in white on the television screen, and whether or not the first channel is a receiving channel is informed to a viewer.

Also, the data representing the first channel, stored in the RAM 3, are taken into the control circuit 7, and a signal representing the frequency area of the first channel is formed from this data and is then supplied from the tuner controller 72 to the tuner 4. Then, the tuner 4 detects whether or not the television signal received by the antenna 5 is present in the frequency area of the first channel, and, when the signal presence is confirmed, an AFT signal representing that the first channel is a receiving channel is output in step S4. Next, the control circuit 7 discriminates whether or not the AFT signal is output from the tuner 4 in step S5.

When the AFT signal is output from the tuner 4, an answer becomes YES in step S5, and this AFT signal is discriminated in the control circuit 7 to store an attribute code for a red display of the character of the first channel into the address of the video RAM 11, in which the attribute code for the flashing white display of the character of the first channel is stored, in place of the latter attribute code in step S6. As a result, the character of the first channel is displayed in red color on the television screen, and the viewer can confirm that the first channel is a receiving channel.

Then, an increment of the discrimination channel number is executed in step S8, and it is discriminated whether or not the discrimination of all the channels is finished in step S9. When it is discriminated that the discrimination of all the channels is not finished in step S9, the operation is returned to step S2 and the automatic search program continues to the discrimination for the next step (for the second channel). The steps S2 to S9 are repeated until the discrimination of all the channels is finished.

In turn, in step S5, when the AFT signal is not output from the tuner 4, the answer becomes NO in step S5, and the attribute code for the white display of the character of the first channel is stored into the address of the video RAM 11, in which the attribute code for the flashing white display of the character of the first channel is stored, in place of the latter attribute code in step S7. As a result, the character of the first channel is displayed in white color on the television screen, and the viewer can confirm that the first channel is not a receiving channel. Then, the operation is moved to step S8.

As described above, due to the above-described operation, it can be confirmed which channels are receiving channels by looking at only one screen of the television receiver.

Further, in addition to the discrimination of all the channels, the command output from the input part 6 can be interpreted by the control circuit 7, and only the channel selected by the viewer can be set to the receiving condition.

According to the present invention, while the list of all the channel numbers is displayed on the television screen, by changing the display state of the channel number depending on the receiving state discrimination, it is readily confirmed which channel is a receiving channel, and hence it is confirmed at a glance which channels are in a receiving condition. Therefore, the receiving channel confirmation operation can be carried out in a simple and exact manner.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A channel display device for indicating a signal-receiving state of a plurality of television channels, each channel having a respective given carrier frequency and channel number, in response to a determination as to whether or not each channel is signal receivable, the channel display device comprising:

on-screen means having a video RAM in which character codes corresponding to the channel numbers of all television broadcast channels are written at addresses corresponding to display positions of the channel numbers, and for displaying a list of the television broadcast channel numbers on a TV screen in response to data read out of the video RAM;

memory means for storing data showing channel numbers and address data of the video RAM corresponding to the channel numbers when determining whether or not a channel number selected among the list of all channel numbers displayed on the TV screen is signal receivable;

first means for storing first attribute data in a predetermined address in the video RAM in response to the address data of the video RAM corresponding to a channel number stored in the memory means, said first attribute data showing that a channel is undergoing a determination as to whether the channel is signal receivable or not;

tuning means for detecting whether or not a channel at a given carrier frequency is signal receivable in response to channel number data stored in the memory means, and for generating a tuning signal showing that the channel is signal receivable, when it is detected that television signals are received at the given carrier frequency; and second means for rewriting, in response to the tuning signal for a channel, the first attribute data stored in the predetermined address of the video RAM into a second attribute data showing that the channel for which the tuning signal is generated is television signal receivable.

2. The channel display device of claim 1, wherein the second means rewrites the attribute for the channel number corresponding to carrier frequency of a received television signal to change a display color of the channel number on the television screen.

3. The channel display device of claim 2, wherein the second means rewrites a predetermined attribute for the channel number corresponding to the channel number to be detected while it is not yet detected whether or not the television signal is receivable by the tuning means.

4. The channel display device of claim 3, wherein the second means rewrites the attribute for the channel number to be detected to an attribute for a flashing display.

5. The channel display device of claim 1, further comprising channel number input means for inputting the channel number,
wherein the tuner control means discriminates whether or not only the television signal corresponding to the channel number input from the channel number input means is receivable.

* * * * *